United States Patent [19]

Yang

[11] 4,250,530
[45] Feb. 10, 1981

[54] FIXED AND MOVABLE SUPPORTING OF DUAL MAGNETIC HEADS

[75] Inventor: Charles S. Yang, Santa Barbara, Calif.

[73] Assignee: Yang Electromagnetic Systems Inc., Ventura, Calif.

[21] Appl. No.: 82,108

[22] Filed: Oct. 5, 1979

Related U.S. Application Data

[63] Continuation of Ser. No. 938,437, Aug. 31, 1978, abandoned.

[51] Int. Cl.³ .................. G11B 21/22; G11B 5/54; G11B 5/60
[52] U.S. Cl. .................................. 360/105; 360/99; 360/102; 360/103
[58] Field of Search ............... 360/102, 103, 104, 105, 360/99

[56] References Cited

U.S. PATENT DOCUMENTS

| | | | |
|---|---|---|---|
| 3,855,625 | 12/1974 | Garnier et al. | 360/103 |
| 3,896,495 | 7/1975 | Beecroft | 360/103 |
| 4,085,428 | 4/1978 | Green et al. | 360/99 |
| 4,089,029 | 5/1978 | Castrodale et al. | 360/99 |
| 4,151,573 | 4/1979 | Tandon et al. | 360/104 |
| 4,191,980 | 3/1980 | King et al. | 360/103 |

Primary Examiner—Robert S. Tupper
Attorney, Agent, or Firm—William W. Haefliger

[57] ABSTRACT

Dual magnetic heads or transducers supported on fixed and movable arms, respectively, the transducers having pad structure defining rails extending in the direction of magnetic media travel between the transducers, and characterized by low load exertion on the media. Universal pivoting of one or both heads is also provided.

26 Claims, 15 Drawing Figures

FIXED AND MOVABLE SUPPORTING OF DUAL MAGNETIC HEADS

This is continuation of application Ser. No. 938,437, filed Aug. 31, 1978, now abandoned.

BACKGROUND OF THE INVENTION

This invention relates generally to magnetic transducers usable with magnetic media such as so-called floppy discs. More particularly it concerns the arm structures which mount such transducers, as well as the transducers themselves which in operation are located at opposite sides of such discs.

In the past, circular transducer "buttons" or sliders were commonly employed on arms which are swingable toward and away from the magnetic disc. It was found in many cases that this construction resulted in undesirably heavy "penetration" or deflection of the disc by one or both buttons, leading to increased wear and reduced life of the disc. Also, difficulties were encountered in accurately locating one slider relative to the other, it being necessary to accurately offset them, away from coaxial registration so as to prevent magnetic interference therebetween. Further, it was not possible to simply and easily vary the yieldable urging of the arms relatively toward the magnetic media, or disc.

Efforts toward overcoming the above problems led to the provision of one fixed transducer at one side of the disc, and a slider movable toward and away from the disc at its opposite side; however, the above problems in the main were not overcome. Also, differences in design as between the two sliders led to problems attributable to media surface engagement characteristics of the two sliders, the problem of excessive penetration or deflection of the media by one slider remaining.

SUMMARY OF THE INVENTION

It is a major object of the invention to provide magnetic heads and supporting thereof characterized as overcoming the above as well as other problems associated with prior designs. Associated objects include the provision for identical media surface contact by the two sliders; precise offset referencing of the two sliders so as to maintain desired track separation; and identical aerodynamic characteristics of the two sliders productive of low load exertion on the media, less penetration of the media, and less wear of the media and heads; and adjustability of yieldable force exertion on one swingable arm urging one transducer toward the media, and the other arm and transducer remaining fixed; and provision for universal pivoting of one or both pressure pads (associated with the transducers) relative to the arms which carry the two pads.

Basically, the invention is embodied in the combination which includes:

(a) a pair of magnetic transducers, and a pair of arms supporting the transducers in opposed facing relation for magnetic coupling to the medium magnetic surface extents, one of the arms being movable relatively toward and away from the other arm, (b) each of the transducers having pad structure defining a pair of generally parallel, outwardly projecting rails which are spaced apart, the rails extending in the direction of magnetic media travel between and relative to the transducers, the rails defining slide surfaces engageable with the media.

As will be seen, each transducer typically includes read/write and erase pole structure associated in each transducer with one rail only; the rails typically have angled ends to provide air bearings adjacent the magnetic media; the rail defining pad structure for at least one transducer is eccentrically located relative to the transducer housing so as to prevent interference between slider corners and the floppy disc upon insertion of the disc between the arms; a flat spring may hingedly support the swingable arm, or the latter may be hinged by a pivot rod; a torsion spring yieldably urges the swingable arm toward the fixed arm, with adjustable positioning of one spring leg to enable spring force selectively; the swingable arm may carry reference shoulder structure to enable precision location of the transducer on that arm relative to the transducer on the other arm; a flexure carried by one arm such as the swingable arm enables universal pivoting of the transducer carried by that arm, and relative to the latter and to the transducer carried by the other arm; similar flexures may be carried by both arms to enable universal pivoting of both transducers; adjustable pivot bars may be provided on the two arms to enable universal pivoting or self-gimbaling of the transducers; and ramp means may be associated with at least one pad to facilitate relative insertion of a floppy disc between the two transducer pads.

These and other objects and advantages of the invention, as well as the details of illustrative embodiments, will be more fully understood from the following description and drawings, in which:

DETAILED DESCRIPTION

Figure 1:
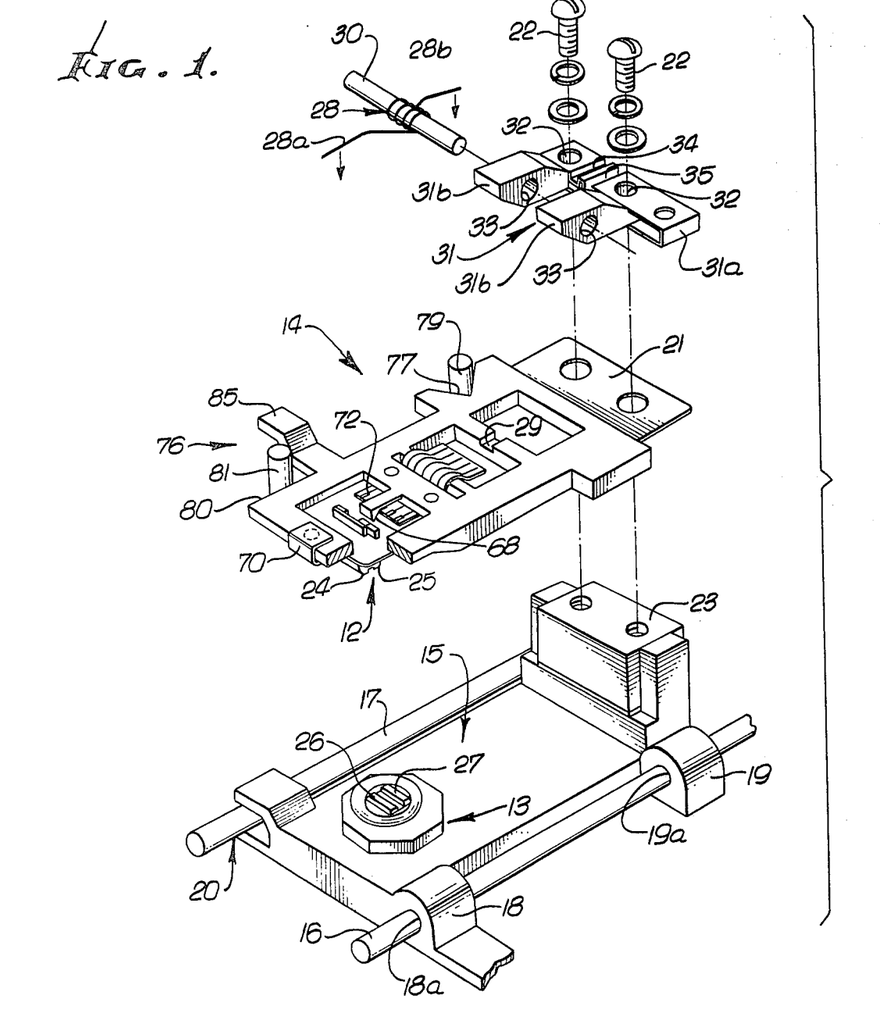
FIG. 1 is an exploded perspective view of an assembly comprising one form of the invention.
Figure 1A:
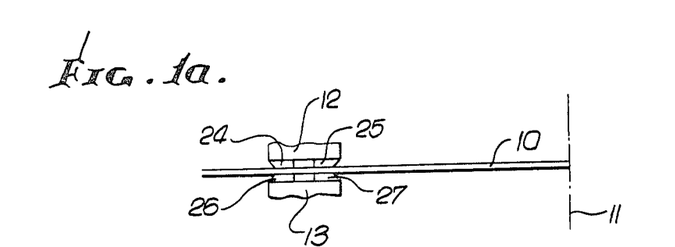
FIG. 1a is a fragmentary view showing a floppy disc engaged by upper and lower heads.

Referring first to FIG. 1a, a magnetic medium, such as floppy disc 10, is rotatable about axis 11, and upper and lower magnetic transducer heads 12 and 13 are positioned above and below the disc for magnetic coupling (read/write or erase) to the medium upper and lower magnetic surface extents. The arms carrying the transducers are shown in FIG. 1 at 14 and 15, lower arm 15 typically being fixed and upper arm 14 being movable toward and away from the lower arm. Thus, for example, the longitudinally elongated lower arm 15 may be carried by fixed guide rails 16 and 17 which also extend longitudinally. Rail 16 passes through bores 18a and 19a in bosses 18 and 19, and rail 17 extends through a bracket 20 integral with the side of arm 15 opposite the bosses 18 and 19.

Upper arm 14 has a flat metal spring 21 integrally connected to one end thereof, the flat spring being removably attached as by fasteners 22 to a fixed mount 23 integral with one end of arm 15. The flat spring accommodates yieldable flexing movement of arm 14 relative to arm 15, as for example up and down relative to the latter, the flat spring acting as a hinge. Such movement is desired when the floppy disc is inserted between the arms, or removed from that position.

Yieldable means is provided to urge arm 14 toward arm 15, so as to cause the two upper rails 24 and 25 associated with transducer 12 to engage the upper side of the floppy disc with precisely the desired pressure, the two lower rails 26 and 27 associated with transducer 13 then also engaging the lower side of the disc with precisely the desired pressure. Such yieldable means advantageously comprises a torsion spring 28 having a first leg 28a engaging and urging arm 14 toward arm 15. A notch 29 is arm 14 receives leg 28a. Torsion spring carrier structure may include an element such as dowel 30 about which the spring is wound, and a second element 31 supporting the dowel and connected to fixed mount 23. Support element 31 is shown to include a base 31a with openings 32 to pass fasteners 22, and two spaced supports 31b having openings 33 to receive the dowel 30. Accordingly, the spring winding is located between the supports, and a second leg 28b of the spring exerts reactive loading on the support base 31a. The latter has multiple support loci 34 and 35 of different depths to receive spring leg 28b, and either notch (or additional loci of different depths) may be selected to receive leg 28b to cooperate with same for producing selected force exertion by the spring first leg 28a on the arm 14. Accordingly, the yieldable force acting to close arm 14 toward arm 15 may be selected so as to achieve optimum cooperation or surface engagement with the floppy disc.

Figures 9, 10, 11:
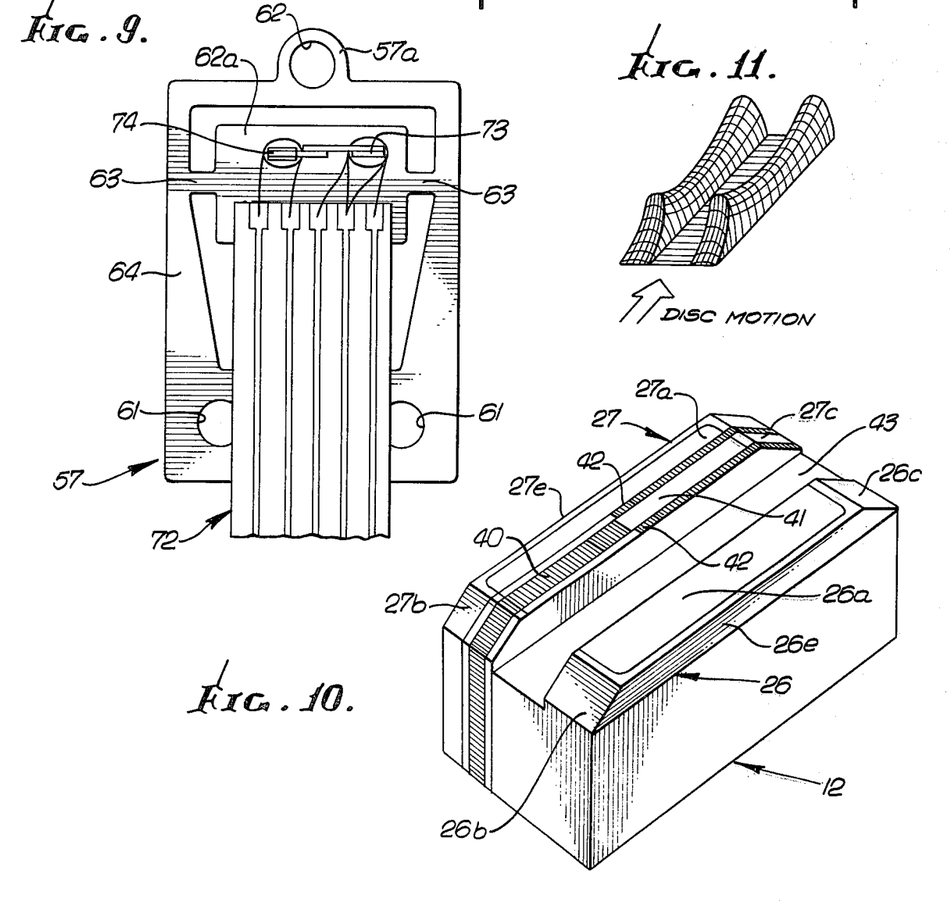
FIG. 9 is a plan view of the FIG. 7 flexure assembly, taken on lines 9—9 of FIG. 8.
FIG. 10 is an enlarged view of the dual rail system employed in the pad structure of FIGS. 5-9.
FIG. 11 is a schematic representation of air-bearing pressure associated with the FIG. 10 dual rail system.

As referred to, each transducer has pad structure defining a pair of generally parallel, outwardly projecting, like sized rails (i.e. upper rails 24 and 25, and lower rails 26 and 27) which are laterally spaced apart, the rails extending generally in the direction of magnetic media (i.e. floppy disc) travel between and relative to the transducers 12 and 13, the rails defining flat slide surfaces engageable with the media. See for example surfaces 26a and 27a associated with rails 26 and 27 in FIG. 10. Each transducer 12 and 13 includes read/write and erase structure, the latter associated with one of the two rails of that transducer; thus, rail 27 incorporates read/write magnetic poles whose tips appear at 40 and 41, as well as erase poles whose tips appear at 42, at laterally opposite sides of the read/write pole tips. The rails are elongated, and have opposite ends which are angled or chamfered, as at 26b, 26c, 27b and 27c, to provide air bearings adjacent the magnetic media. FIG. 11 is a topographic representation of the air bearing effect, and shows that air bearing pressure buildup (as respects air pressure existent between the rail and media) is gradual adjacent the angled surface 26b toward which the magnetic disc relatively approaches. Less pressure build-up occurs with such dual rails, as contrasted with a conventional single rail lacking such end taper, partly due to the fact that two spaced rails 26 and 27 (for example) are used, with the space 43 therebetween receiving air flow acting in part to space the transducer from the media. Also, the design is such that the rails "penetrate" or deflect the floppy disc media to less extent than conventional sliders, whereby media wear is relatively decreased, and life is extended.

Figure 2:
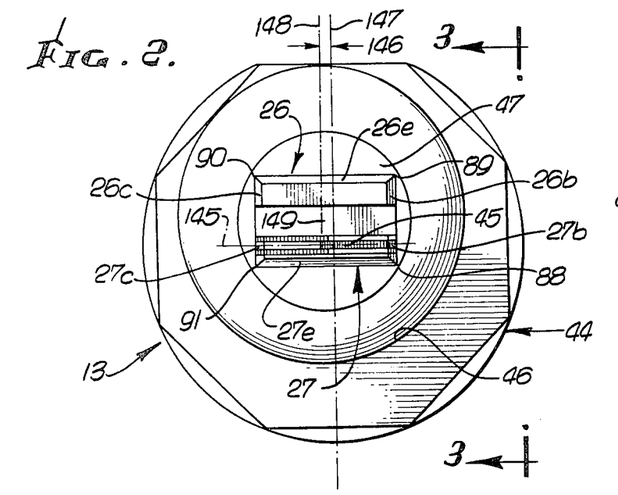
FIG. 2 is an enlarged view of the pad side of a slider seen in FIG. 1.
Figure 3:
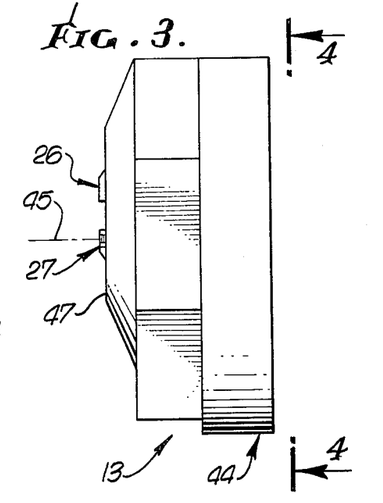
FIG. 3 is a side view on lines 3—3 of FIG. 2.
Figures 4, 5, 6:
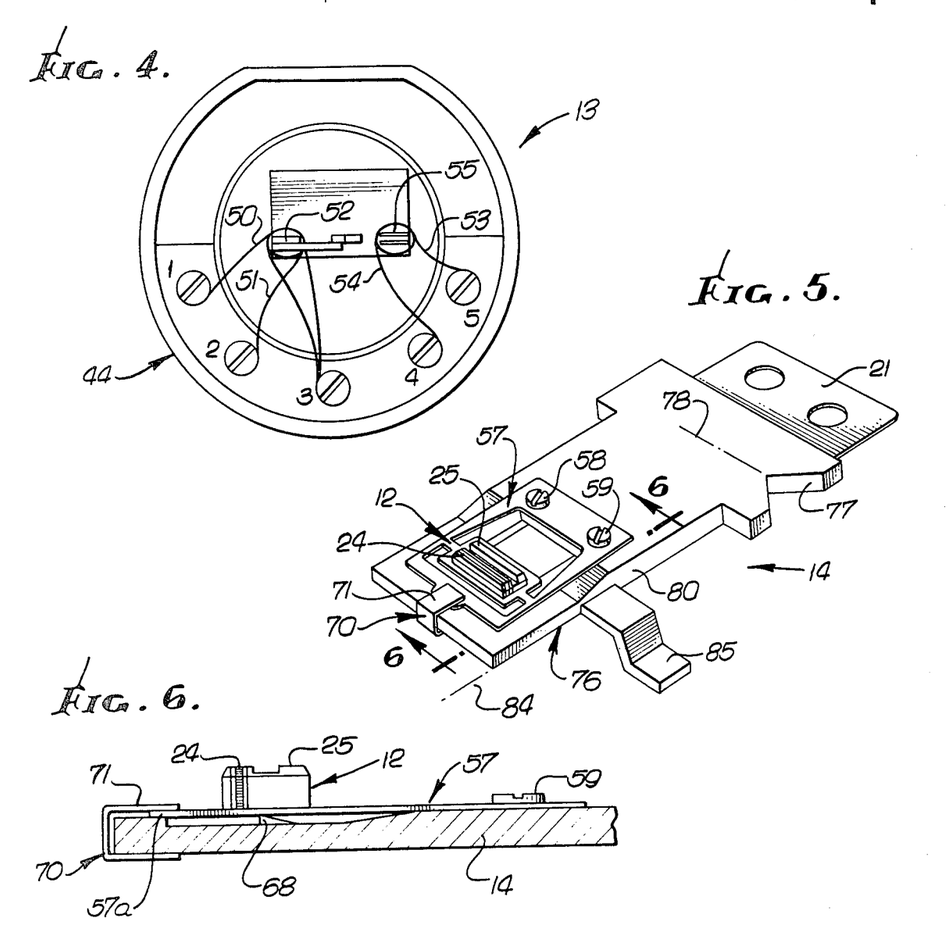
FIG. 4 is an interior view of the slider housing, on lines 4—4 of FIG. 3.
FIG. 5 is a perspective view of a pivotable arm, which is upside down in relation to the same arm seen in FIG. 1.
FIG. 6 is an enlarged section taken on lines 6—6 of FIG. 5.
Figure 7:
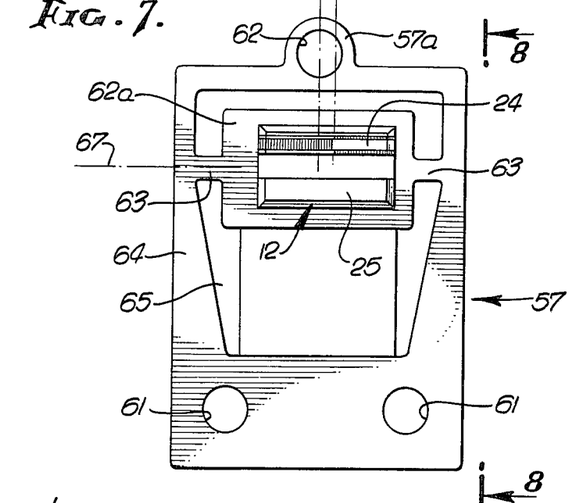
FIG. 7 is a plan view of a flexure assembly as used on the arm of FIGS. 5 and 6.
Figure 8:
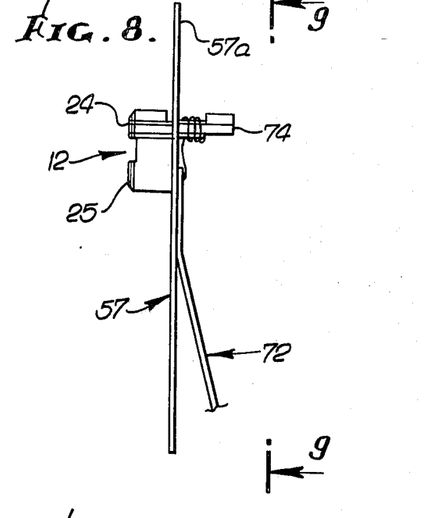
FIG. 8 is a side view of the FIG. 7 flexure taken on lines 8—8 of FIG. 7.

Referring to FIGS. 2 and 3, it will be seen that the transducer 13 includes a circular outline housing 44 having a central axis 45 and a circular end opening 46 within which pad or slider structure 47 is mounted. That end opening is eccentrically located relative to the axis 45, whereby the circular pad structure is also eccentrically located relative to axis 45. The design is such that rail 27 as well as a center line 145 defined by the read/write poles intersect axis 45. An erase gap appears at 146, between plane 147 through axis 45 and plane 148 through axis 149 of cylindrical slider 47. The other rail 27 is everywhere offset from the axis 45. The pad structure defines corners, as at 88–91 associated with the rails, and the defined eccentricity assures that such corners will not protrude to interfere with the media disc jacket upon insertion or removal of the disc relative to the arms 14 and 15 and the transducers 12 and 13. Note in FIG. 1a that the two transducers 12 and 13 are relatively offset by several media tracks, to minimize or reduce magnetic interference therebetween. FIG. 4 shows coil connections at 50 and 51 to read/write probe legs 52, and coil connections at 53 and 54 to erase probe legs 55. Rail side chamfers appear at 26e and 27e in FIG. 10.

Referring to FIGS. 6–9, the upper transducer 12 is shown to be carried by a flexure 57 which is in turn attached to the outboard end portion of arm 14, as via fasteners 58 and 59 extending through the three openings 61 and 62 of the thin, metallic, sheet-flexure 57. The transducer is mounted by a flexure rectangular portion 62a connected by aligned webs 63 to the flexure frame portion 64. The latter extends about and defines an opening 65 within which flexure portion 62a is located, for universal pivoting, accommodated by webs 63. Most compliant pivoting, however, is about an axis 67 defined by the webs, and parallel to the rails 24 and 25. A pivot defined by projection 68 integral with arm 14 projects toward the transducer to pivot same, centrally as by engagement with the bottomside thereof opposite rails 24 and 25. A clip 70 on the end of arm 14 has a flexible metallic leg 71 extending back over the upper end 57a of the flexure 57, as seen in FIG. 6, to allow upward and downward movement of flexible end 57a. FIG. 9 shows wire harness 72 extending to flexure 57, with coil connections to the read/write leg 73 and to the erase leg 74.

FIGS. 1 and 5 show the provision of a reference locating side 76 of arm 14, which forms a V-notch 77 tapering laterally to define a lateral axis 78 relative to which the transducer 12 may be accurately located, longitudinally. Note gaging tooling post 79 in FIG. 1 received in notch 77 to accurately locate arm 14 (and hence transducer 12) relative to guides 16 and 17 and to fixed arm 15 and fixed transducer 13, thereby accurately locating transducer 12 relative to transducer 13. For that purpose, the openings 61 and 62 in flat spring 21 are slightly over size, so that the arm 14 may be slightly shifted longitudinally, as determined by post 79, before fasteners 22 are tightened. Also, reference side 76 forms a longitudinally elongated reference locating edge 80 to define a longitudinal axis 84 relative to which the arm 14 may be accurately located, laterally. Note in FIG. 1 the gaging tooling post 81 engaging edge 80 to accurately locate arm 14 relative to guides 16 and 17. Posts 79 and 81 are suitably associated with guides 16 and 17. FIGS. 1 and 5 also show a lifting leg 85 integral with arm 14, and by means of which that arm may be lifted or pivoted away from arm 15, as accommodated by flat spring hinge 21.

Figure 12:
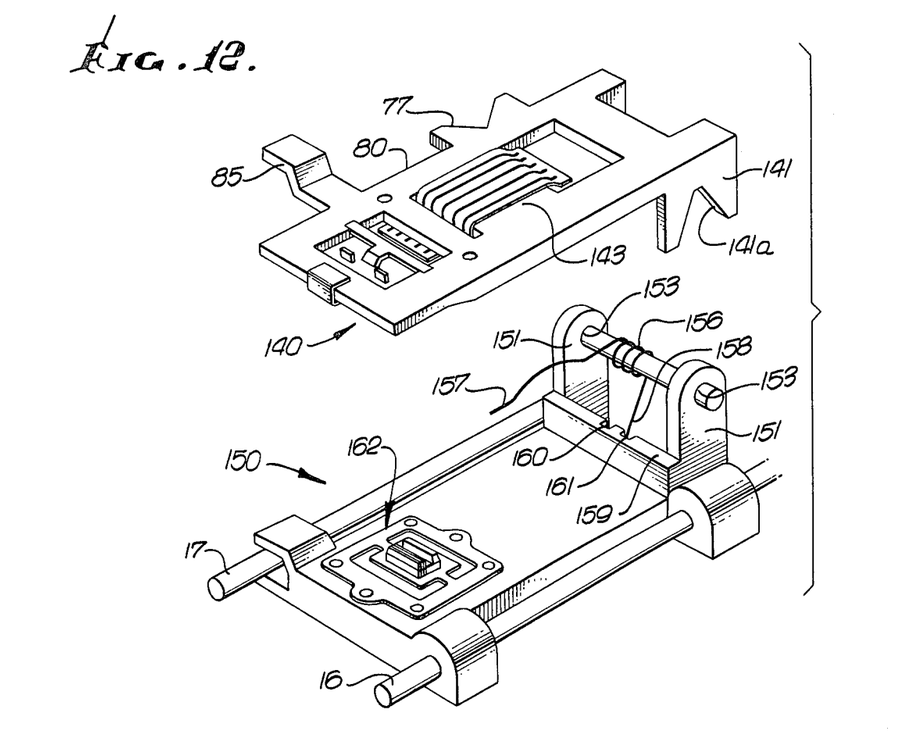
FIG. 12 is an exploded view of a modified assembly comprising another form of the invention.
Figure 13:
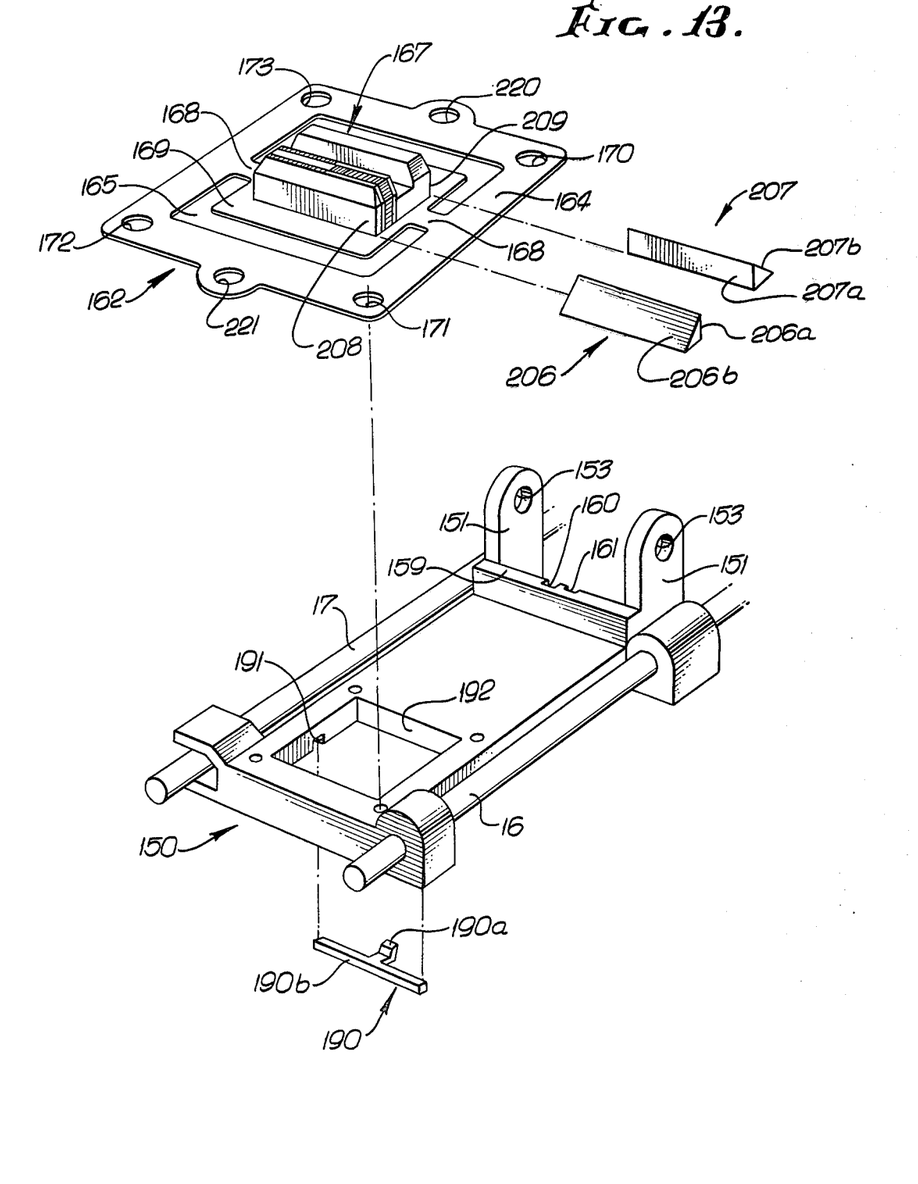
FIG. 13 is an exploded view of a lower head subassembly which is part of FIG. 12.
Figure 14:
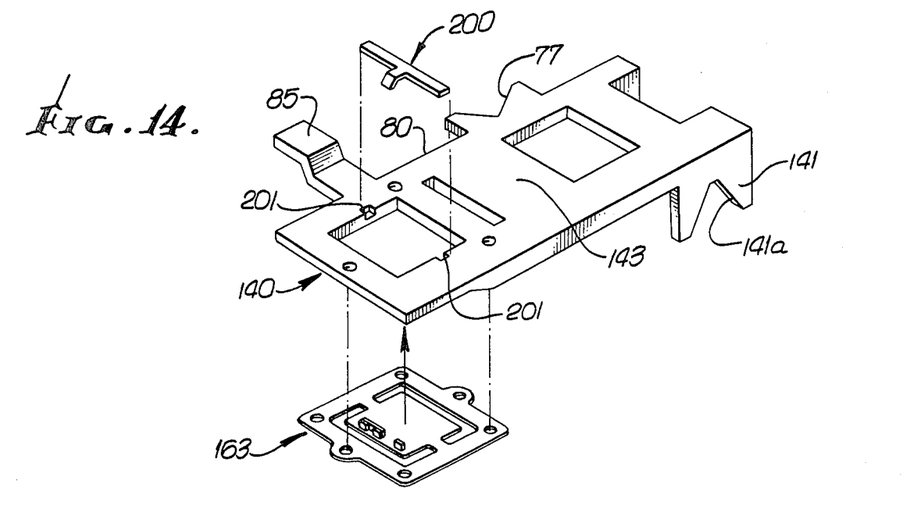
FIG. 14 an exploded view of an upper head subassembly which is part of FIG. 12.

Referring now to FIGS. 12-14 the movable and fixed arms 140 and 150 there shown correspond generally to arms 14 and 15 shown in FIG. 1; however, arm 150 includes a fixed mount in the form of upright mounting legs 151, and a pivot on the form of a dowel 152 received through openings 153 in the legs to extend laterally. As will be seen, the one arm 140 may then be pivotally supported by the pivot or dowel 152 for swingable movement toward and away from the other arm 150. Such support is facilitated by tangs 141 integral with arm 140 and extending downwardly with V-notches 141a to receive the dowel.

Means yieldably urging the one arm toward the other may advantageously include torsion spring 156 wound about the pivot 152, and having a first leg 157 extending over upper arm web 143 and urging that arm downwardly. That spring also has a second leg 158 exerting reactive loading on the mount or first leg, as at mounting flange 159. The latter has multiple support loci (as defined by different depth notches 160 and 161) for selective reception of the second leg. Accordingly, the torsion force exerted by the spring on arm 140, via leg 157, may be varied or selected by shifting the leg 158 between notches 160 and 161. More notches may be employed, if desired.

As is clear from FIGS. 13 and 14, the transducers 120 and 130 carried by the arms may be supported by similar or like flexures 162 and 163. As shown in FIG. 13, the thin sheet, metallic flexure 162 is defined by a frame 164 forming a central opening 165, and having a flexible bridge crossing that opening, the transducer pad structure 167 carried by the bridge. The latter includes webs 168 and center portion 169 carrying the pad structure 167. The latter may be the same as transducer 12 described above. The arrangement of carrier fastener openings 170-173 in the flexure allows 180° reversal of the flexure and transducer, if desired, whereby the same flexure may be used for each arm. Accordingly, the elements of flexures 163 are the same as those for flexure 162. In this regard, the position of the rail carrying the read/write and erase elements is desirably reversed on one arm relative to that rail on the other arm, i.e. it is closer to the arm outer end (than the other rail) in one case, and further from the arm outer end (than the other rail) in the other case. Accordingly, in each case, i.e. for each arm, the associated transducer is pivotable relative to that arm as accommodated by its flexure. Auxiliary fastener openings in the flexure appear at 220 and 221.

Also provided in FIG. 13 is a pivot post 190 with a projection 190a to terminally engage the underside of pad 167 and define a universal pivot point for the pad. The post includes a bar 190b with opposite ends receivable in slots 191 formed in arm 150, at the opposite sides of through opening 192 in that arm over which the pad 167 lies. The slots are slightly oversize so that initially the bar ends may be selectively positioned therein to enable selective positioning of the post projection 190a relative to the pad, for high accuracy. Then, the bar ends may be fixed in the slots, as by epoxide bonding or potting.

A similar post 200 is employed in FIG. 14 to adjustably pivot the pad on flexure 163, corresponding slots in the arm 140 being indicated at 201.

In FIG. 13 optional ramp means are associated with pad 167, and may be attached to it, so as to guide the magnetic medium onto the two rails of the transducer. Thus, like ramp bodies 206 and 207 have sides 206a and 207a to be bonded to the opposite sides 208 and 209 of the pad structure; and the bodies have ramping surfaces 206b and 207b to function as described.

I claim:

1. For use with a magnetic medium having opposite magnetic surface extents, the combination comprising
   (a) a pair of magnetic transducers, and a pair of arms supporting said transducers in opposed facing relation for magnetic coupling to said medium magnetic surface extents, means mounting one of said arms for movement toward and away from the other arm,
   (b) each of said transducers having an air bearing pad means defining a pair of generally parallel, outwardly projecting rails which are spaced apart, said rails extending in the direction of magnetic media travel between and relative to said transducers, said rails generating an air bearing to space the transducer relative to said media upon movement of said media,
   (c) and including flexure means carrying each transducer, each flexure means providing substantially universal pivoting of the associated transducer, each flexure means including a web supporting the associated transducer, the web extending in the general direction of said rails, and a pivot engaging the associated transducer to pivot same substantially universally.

2. The combination of claim 1 wherein each transducer includes read/write and erase structure, said structure mounted on one of said rails, the rails being elongated and having ends which are angled.

3. The combination of claim 1 wherein said mounting means includes a flat spring integral with said one arm, a fixed mount integral with the other arm, and the flat spring connected to said fixed mount to accommodate yieldable flexing movement of said one arm relative to the other arm.

4. The combination of claim 3 including yieldable means urging said one arm toward said other arm.

5. The combination of claim 3 including said media in the form of a rotatable disc extending between said transducers.

6. The combination of claim 1 wherein each said flexure means is defined by a flexible sheet in the form of a frame defining a central opening, and a bridge crossing said opening, the bridge including said web, said pad means carried by said bridge.

7. The combination of claim 1 including ramp means associated with one transducer to guide magnetic media structure onto the rails of said transducer.

8. For use with a magnetic medium having opposite magnetic surface extents, the combination comprising
   (a) a pair of magnetic transducers, and a pair of arms supporting said transducers in opposed facing relation for magnetic coupling to said medium magnetic surface extents, means mounting one of said arms for movement toward and away from the other arm, (b) each of said transducers having air bearing pad means defining a pair of generally parallel, outwardly projecting rails which are spaced apart, said rails extending in the direction of magnetic media travel between and relative to said transducers, said rails generating an air bearing to space the transducer relative to said media upon movement of said media, (c) each transducer including read/write and erase structure, said structure mounted on one of said rails, the rails being elongated and having ends which are angled, (d) the transducer associated with said other arm including a housing having a central axis and an end opening, said pad means generally centered in said end opening, said end opening located eccentrically relative to said axis.

9. The combination of claim 8 wherein said one rail intersects said axis, the other rail being everywhere offset from said axis.

10. For use with a magnetic medium having opposite magnetic surface extents, the combination comprising, (a) a pair of magnetic transducers, and a pair of arms supporting said transducers in opposed facing relation for magnetic coupling to said medium magnetic surface extents, means mounting one of said arms for movement toward and away from the other arm, (b) each of said transducers having an air bearing pad means defining a pair of generally parallel, outwardly projecting rails which are spaced apart, said rails extending in the direction of magnetic media travel between and relative to said transducers, said rails generating an air bearing to space the transducer relative to said media upon movement of said media, (c) and said mounting means includes a flat spring integral with said one arm, a fixed mount integral with the other arm, the flat spring connected to said fixed mount to accommodate yieldable flexing movement of said one arm relative to the other arm, and yieldable means urging said one arm toward said other arm, said yieldable means including a torsion spring having a first leg urging said one arm relatively toward the other arm, and torsion spring carrier means including a first element about which the spring is wound, and a second element supporting said first element and connected to said fixed mount, said spring having a second leg exerting reactive loading on said second element.

11. The combination of claim 10 wherein said second element has multiple support loci for said second leg to thereby allow selected force exertion by the spring first leg on said one arm.

12. The combination of claim 10 including a flexure means carrying said transducer associated with said one arm, the flexure means providing substantially universal pivoting of the transducer.

13. The combination of claim 12 wherein each flexure means is defined by a frame defining a central opening and a flexible bridge crossing said opening, the pad means carried by the bridge.

14. The combination of claim 13 including a pivot post engaging the pad means to define a universal pivot point.

15. For use with a magnetic medium having opposite magnetic surface extents, the combination comprising (a) a pair of magnetic transducers, and a pair of arms supporting said transducers in opposed facing relation for magnetic coupling to said medium magnetic surface extents, means mounting one of said arms for movement toward and away from the other arm, (b) each of said transducers having an air bearing pad means defining a pair of generally parallel, outwardly projecting rails which are spaced apart, said rails extending in the direction of magnetic media travel between and relative to said transducers, said rails generating an air bearing to space the transducer relative to said media upon movement of said media, (c) said one arm being longitudinally elongated, said rails associated with said one arm being laterally elongated, said one arm having a reference locating side including a generally V-shaped notch which tapers laterally to define a lateral axis for contacting a fixed locating means to accurately locate said one arm longitudinally.

16. The combination of claim 15 wherein said one arm locating side also includes a longitudinally elongated reference locating edge to define a longitudinal axis for contacting a further fixed locating means to accurately locate said one arm laterally.

17. For use with a magnetic medium having opposite magnetic surface extents, the combination comprising (a) a pair of magnetic transducers, and a pair of arms supporting said transducers in opposed facing relation for magnetic coupling to said medium magnetic surface extents, means mounting one of said arms for movement toward and away from the other arm, (b) said mounting means including a flat spring integral with said one arm, a fixed mount integral with the other arm, and the flat spring connected to said fixed mount to accommodate yieldable flexing movement of said one arm relative to the other arm, (c) said one arm being longitudinally elongated, and said one arm having a reference locating side including a generally V-shaped notch which tapers laterally to define a lateral axis for contacting a fixed location means to accurately locate said one arm longitudinally.

18. The combination of claim 17 wherein said one arm locating side also includes a longitudinally elongated reference locating edge to define a longitudinal axis for contacting a further fixed locating means to locate said one arm laterally.

19. The combination of claim 17 including a flexure means carrying the transducer on said one arm, said flexure means providing substantially universal pivoting of the transducer.

20. The combination of claim 17 including said media in the form of a rotatable disc extending between said transducers.

21. For use with a magnetic medium having opposite magnetic surface extents, the combination comprising (a) a pair of magnetic transducers, and a pair of arms supporting said transducers in opposed facing relation for magnetic coupling to said medium magnetic surface extents, means mounting one of said arms for movement toward and away from the other arm, (b) each of said transducers having an air bearing pad means defining a pair of generally parallel, outwardly projecting rails which are spaced apart, said rails extending in the direction of magnetic media travel between and relative to said transducers, said rails generating an air bearing to space the transducers relative to said media upon movement of said media, (c) there being flexure means carrying at least one of the transducers and providing substantially universal pivoting thereof, the flexure means including an element extending in the general direction of said rails.

22. The combination of claim 21 wherein the transducer includes read/write pole means associated with only one of said rails.

23. The combination of claim 21 including yieldable means urging said one arm toward said other arm.

24. The combination of claim 23 wherein said yieldable means includes a torsion spring having a first leg urging said one arm toward the other arm, and torsion spring carrier means including a first element about which the spring is wound, and a second element supporting said first element and connected to said fixed mount, said spring having a second leg exerting reactive loading on said second element.

25. The combination of claim 24 wherein said second element has multiple support loci for said second leg to thereby allow selected force exertion by the spring first leg on said one arm.

26. For use with a magnetic medium having opposite magnetic surface extents, the combination comprising (a) a pair of magnetic transducers, and a pair of arms supporting said transducers in opposed facing relation for magnetic coupling to said medium magnetic surface extents, means mounting one of said arms for movement toward and away from the other arm, (b) each of said transducers having an air bearing means defining a pair of generally parallel, outwardly projecting rails which are spaced apart, said rails extending in the direction of magnetic media travel between and relative to said transducers, said rails generating an air bearing to space the transducer relative to said media upon movement of said media, (c) there being flexure means carrying at least one of the transducers and providing substantially universal pivoting thereof, the flexure means including an element extending in the general direction of said travel, (d) at least one transducer including read/write pole means associated with one of said rails.

* * * * *